US011423286B2

(12) United States Patent
Nagata et al.

(10) Patent No.: US 11,423,286 B2
(45) Date of Patent: Aug. 23, 2022

(54) COMPUTING SYSTEM AND METHOD

(71) Applicant: HITACHI, LTD., Tokyo (JP)

(72) Inventors: Sanato Nagata, Tokyo (JP); Tadashi Okumura, Tokyo (JP); Masahiko Ando, Tokyo (JP)

(73) Assignee: HITACHI, LTD., Tokyo (JP)

( * ) Notice: Subject to any disclaimer, the term of this patent is extended or adjusted under 35 U.S.C. 154(b) by 335 days.

(21) Appl. No.: 16/887,008

(22) Filed: May 29, 2020

(65) Prior Publication Data

US 2020/0387775 A1 Dec. 10, 2020

(30) Foreign Application Priority Data

Jun. 6, 2019 (JP) .............................. JP2019-106056

(51) Int. Cl.
*G06N 3/04* (2006.01)
*G06F 17/16* (2006.01)
*G06N 3/067* (2006.01)
*G06N 3/08* (2006.01)

(52) U.S. Cl.
CPC ........... *G06N 3/0445* (2013.01); *G06F 17/16* (2013.01); *G06N 3/0472* (2013.01); *G06N 3/0675* (2013.01); *G06N 3/08* (2013.01)

(58) Field of Classification Search
CPC .. G06N 3/0445; G06N 3/0472; G06N 3/0675; G06N 3/08; G06F 17/16
See application file for complete search history.

(56) References Cited

U.S. PATENT DOCUMENTS 10,891,536 B1*  1/2021 Merkel ................ G06N 3/0445
2009/0043722 A1*  2/2009 Nugent ................. G06N 3/084
706/29
2019/0335006 A1* 10/2019 George ................ G06N 3/0454

OTHER PUBLICATIONS

Lukoševičius, Mantas, and Herbert Jaeger. "Reservoir computing approaches to recurrent neural network training." Computer Science Review 3.3 (2009): 127-149. (Year: 2009).*
Triefenbach, Fabian, and Jean-Pierre Martens. "Can non-linear readout nodes enhance the performance of reservoir-based speech recognizers?." 2011 First International Conference on Informatics and Computational Intelligence. IEEE, 2011. (Year: 2011).*

(Continued)

*Primary Examiner* — Fayyaz Alam
(74) *Attorney, Agent, or Firm* — Volpe Koenig

(57) ABSTRACT

A technology that can enhance the computing performance of a computing system using reservoir computing (RC), includes a computing system which performs computation using a recurrent neural network (RNN) including an input unit, a reservoir unit, and an output unit. The reservoir unit includes a plurality of nodes circularly connected to each other. The circular connection has a weight matrix for determining a weight between the nodes of the plurality of nodes, in which a weight between the nodes closely arranged on the circle is larger than a weight between the nodes arranged away from each other on the circle. The plurality of nodes each have a g value that is a parameter for designating nonlinearity of an activation function of each of the nodes, and that is set so as to periodically change in a direction on the circle.

13 Claims, 13 Drawing Sheets

(56) References Cited

OTHER PUBLICATIONS

Andrecut, M. "Reservoir computing on the hypersphere." International Journal of Modern Physics C 28.07 (2017): 1750095. (Year: 2017).*

Masanobu Inubushi and Kazuyuki Yoshimura, "Reservoir Computing Beyond Memory-Nonlinearity Trade-off," Scientific Reports 7, 10199 (2017).

* cited by examiner 11, 12, 13: NODE
200: RC (RESERVOIR COMPUTING)
201: INPUT UNIT
202: RESERVOIR UNIT
203: OUTPUT UNIT
204, 206, 207: LINK (NODE-TO-NODE COUPLINGCONNECTION)
205: PAIR (NODE PAIR)

FIG. 7A

TABLE 1

| $S^{max}_{so}$ | Target type (o) | | | | | | |
|---|---|---|---|---|---|---|---|
| | 1 | 2 | 3 | 4 | 5 | 6 | 7 |
| sensor type (s) 1 | 1 | 0 | 0 | 1 | 1 | 0 | 1 |
| 2 | 0 | 1 | 0 | 1 | 0 | 1 | 1 |
| 3 | 0 | 0 | 1 | 0 | 1 | 1 | 1 |

FIG. 7B

TABLE 2

| Coefficients | Target type (o) | | | | | | |
|---|---|---|---|---|---|---|---|
| | 1 | 2 | 3 | 4 | 5 | 6 | 7 |
| $\alpha_{so}$ | 1 | 1 | 1 | 4 | 4 | 4 | 7 |
| $\beta_{so}$ | 2 | 2 | 2 | 5 | 5 | 5 | 8 |

FIG. 8A
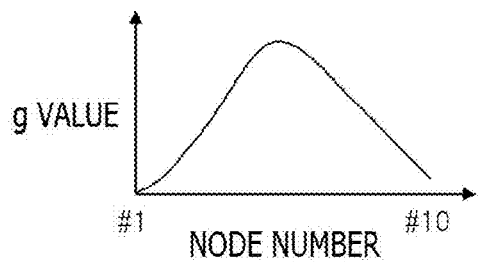
FIG. 8B
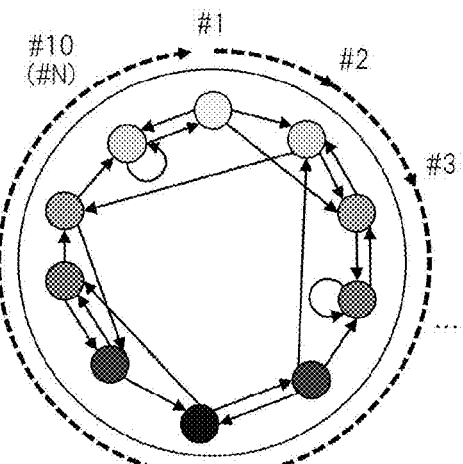
FIG. 8C
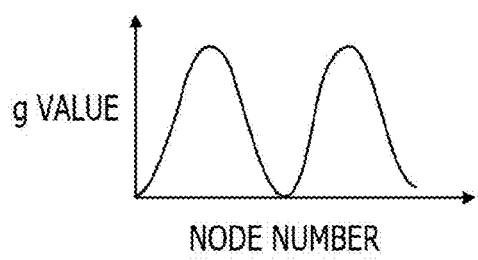
FIG. 8D
SET OF g VALUES
{ g1, g2, g3, ······, gN-1, gN }
FIG. 8E
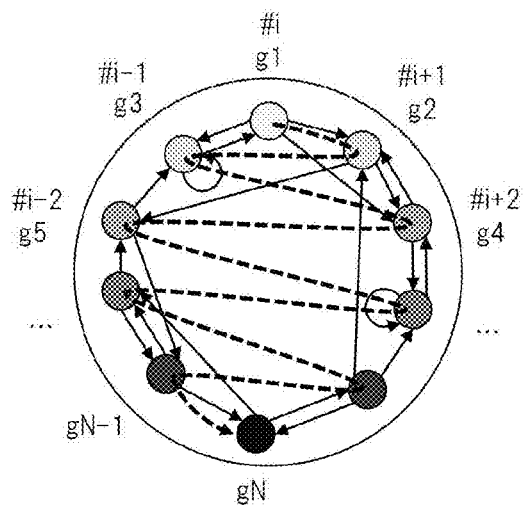

$W_{ij}^{rand}$

NODE NUMBER (i)

$W_{ij}^{gauss}$ $W_{ij}^{res}$

COMPUTING SYSTEM AND METHOD

BACKGROUND OF THE INVENTION

1. Field of the Invention

The present invention relates to a technology for computing systems including, for example, computers configured to perform information processing such as nonlinear operation, time series signal processing, or machine learning, and relates to a technology related to recurrent neural networks (sometimes referred to as "RNNs").

2. Description of the Related Art

Among information processing by machine learning, artificial neural networks (ANNs) exhibit high identification performance of image or voice information processing, for example. ANNs are neural networks (NNs) that are imitations of the functions and structures of neurons in a brain. ANNs include feedforward neural networks (feedforward NNs) and recurrent NNs (RNNs). Feedforward NNs are NNs in which signals are transmitted only in one direction in the network. RNNs are NNs that allow signals to travel backward in the network, and are a model in which signals are propagated bidirectionally. In particular, RNNs in which output signals change depending on the history of input signals are algorithms suitable for time series signal processing on information in which the order is meaningful, for example, voice, text, or moving images. In an RNN, a directed graph in which connections between nodes are based on an array is formed. An RNN uses internal states, in other words, memory to handle relevant inputs. RNNs are useful for tasks such as character recognition and voice recognition.

In a general RNN, it is necessary to determine weights between all nodes, which are computing units that form the network, by learning. This means that the computing cost exponentially increases with respect to an increase in number of nodes or amount of data, and hence significant computational resources are required to achieve high-speed processing.

In view of such a problem, reservoir computing (RC) that is one type of RNN has gathered attention. In the RC, the network structure is divided into the three layers of an input layer, a hidden layer, and an output layer, and only weights between the hidden layer and the output layer are learned. The hidden layer is also called "reservoir." In the RC, the weights of the recurrent hidden layer are fixed. The RC thus has features of greatly reducing the number of parameters in learning and easily achieving high-speed processing as compared to general RNNs. Moreover, in the RC, the modulation of the network structure of the hidden layer is not necessary, and hence the hidden layer can be replaced by an element utilizing physical properties, such as an optical circuit, a soft material, a magnetic body, or a molecule. In particular, optical RC implemented utilizing an optical circuit achieves high-speed information processing by virtue of high-speed light propagation.

In RC, in general, nonlinear transformation is employed for node computing processing, and the signal conversion nonlinearity and the storage capability for past signal information have a trade-off relationship. To achieve both nonlinearity and a storage capability, as RC in a related art example, there has been proposed a method that randomly connects nodes configured to perform nonlinear transformation and nodes configured to perform linear transformation to each other. For example, such a method is proposed in Masanobu Inubushi and Kazuyuki Yoshimura, "Reservoir Computing Beyond Memory-Nonlinearity Trade-off," Scientific Reports 7, 10199 (2017).

However, a computing system using the RC in the related art example has room for improvement in computing performance. In the RC in the related art example, the signal identification accuracy of only one of, for example, tasks for which linear transformation is desired and tasks for which nonlinear transformation is desired can be high, and the signal identification accuracy of the other tasks is sometimes degraded.

SUMMARY OF THE INVENTION

It is an object of the present invention to provide a technology that can enhance the computing performance of a computing system using the above-mentioned RC. It is another object of the present invention to provide a technology that can achieve signal identification with high accuracy even in a case where it is unknown whether a task is a task for which linear transformation is desired or a task for which nonlinear transformation is desired, in other words, irrespective of signal conversion characteristics desired for the task. Problems other than the ones described above are described in the description of the embodiments.

A typical embodiment of the present invention has the following configuration. According to one embodiment, there is provided a computing system configured to perform computation using a recurrent neural network including an input unit, a reservoir unit, and an output unit. The reservoir unit includes a plurality of nodes circularly connected to each other. The circular connection has a weight matrix for determining a weight between nodes of the plurality of nodes and has, in the weight matrix, a weight between nodes closely arranged on the circle, the weight being larger than a weight between nodes arranged away from each other on the circle. The plurality of nodes each have a g value that is a parameter for designating nonlinearity of an activation function of each of the nodes, and that is set so as to periodically change in a direction on the circle.

According to the typical embodiment of the present invention, the computing performance of the computing system using the above-mentioned RC can be enhanced. Further, according to the typical embodiment, it is possible to achieve signal identification with high accuracy irrespective of signal conversion characteristics desired for tasks.

BRIEF DESCRIPTION OF THE DRAWINGS

FIGS. 7A and 7B are diagrams illustrating a table related to how a constant $S^{max}_{so}$ in Expression 9 is set, and a table related to how coefficients in Expression 6 are set in Embodiment 1;

FIGS. 8A to 8E are explanatory diagrams illustrating how the g value of the reservoir unit is set in Embodiment 1;

DESCRIPTION OF THE PREFERRED EMBODIMENTS

Now, embodiments of the present invention are described in detail with reference to the drawings.

[Problems]

Figure 10:
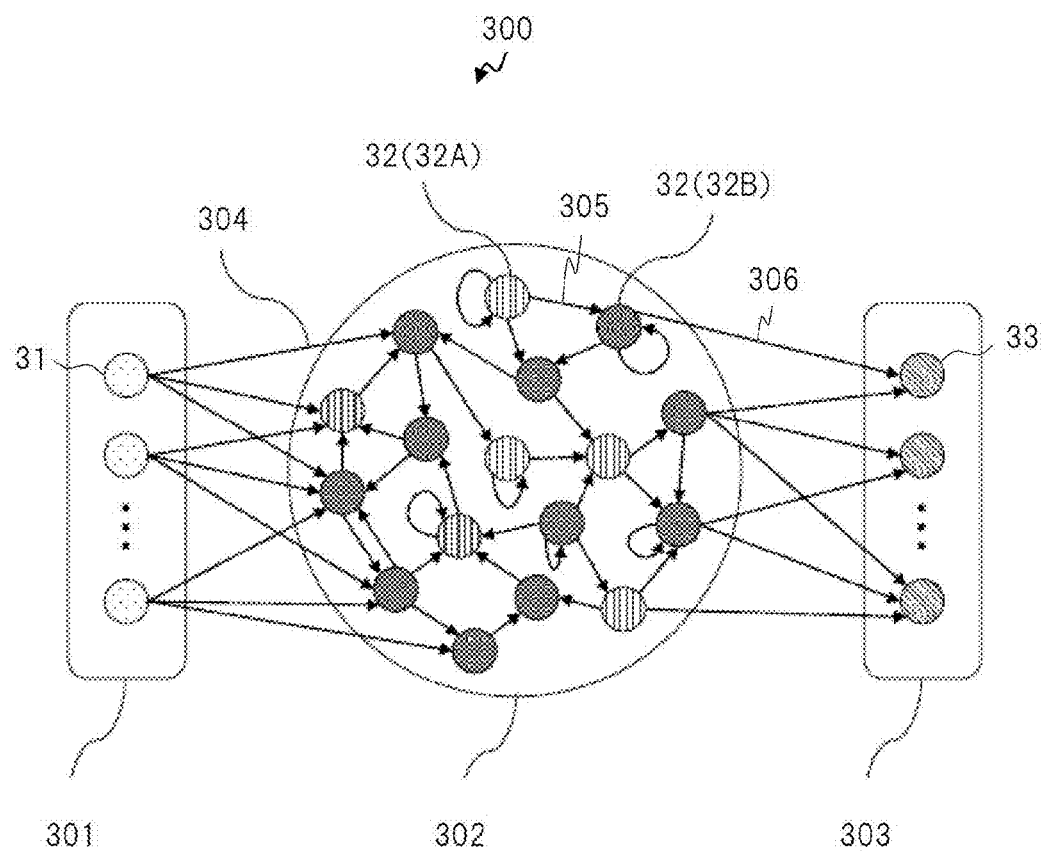
FIG. 10 is a diagram illustrating the structural concept of RC in a computing system of a comparative example.

Additional descriptions are provided for the problems. FIG. 10 illustrates, as a comparative example of the embodiments, a structure example of RC in a related art example. A reservoir unit 302 of RC 300 has a feature of including, as a plurality of nodes 32 randomly connected to each other, linear operation nodes 32A and nonlinear operation nodes 32B in a mixed manner.

The RC 300 in FIG. 10 includes an input unit 301, the reservoir unit 302, and an output unit 303. The input unit 301 includes a plurality of nodes 31 corresponding to the plurality of data of input signals. The output unit 303 includes a plurality of nodes 33 corresponding to the plurality of data of output signals. The reservoir unit 302 includes the plurality of nodes 32, and the nodes 32 are connected to each other by a link 305. The connections between the nodes 32 are defined by a weight matrix. The nodes 31 of the input unit 301 are each connected to some of the nodes 32 of the reservoir unit 302 by a link 304. The nodes 33 of the output unit 303 are each connected to some of the nodes 32 of the reservoir unit 302 by a link 306. The links 304, 305, and 306 are node-to-node connections.

The nodes 32 of the reservoir unit 302 include the linear operation nodes 32A and the nonlinear operation nodes 32B. Computation at each of the nodes 32 is computation based on an activation function. At the linear operation node 32A, for example, linear operation such as y=ax is performed. At the nonlinear operation node 32B, for example, nonlinear operation such as y=tanh(x) is performed.

In this way, in the RC in the related art example, in the network structure of the reservoir unit 302, the linear operation nodes 32A and the nonlinear operation nodes 32B randomly connected to each other are mixed. However, even such a RC can achieve either tasks to which linear operation is suitable or tasks to which nonlinear operation is suitable as signal processing tasks with high accuracy.

Figure 11:
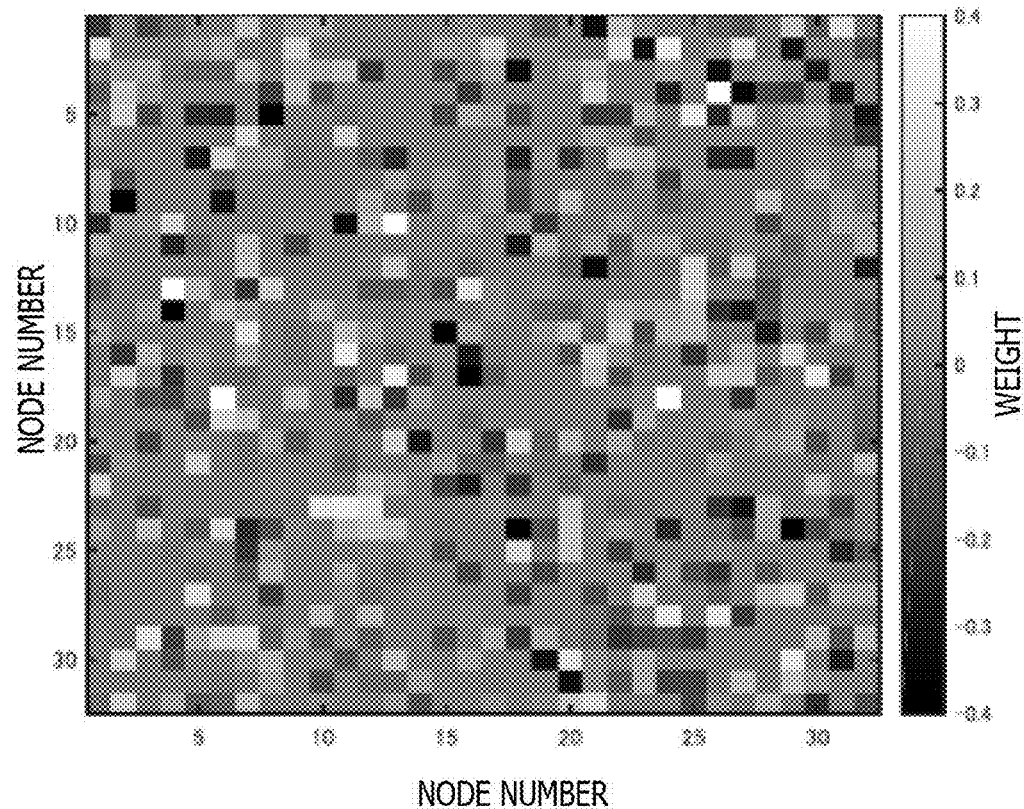
FIG. 11 is a diagram illustrating a heat map corresponding to a weight matrix in the RC in the computing system of the comparative example.

FIG. 11 corresponds to the RC 300 in FIG. 10, and illustrates a heat map corresponding to the weight matrix that defines the network structure of the reservoir unit 302. In the heat map, weights between the nodes 32 randomly connected each other are expressed by gradation. In the heat map, as illustrated in FIG. 11, the value of white indicating a large weight and the value of black are randomly distributed. The weight matrix has randomly selected weights, in other words, stochastically selected weights. The plurality of nodes 32 of the reservoir unit 302 of the RC 300 in the comparative example are connected to each other with the random weights on the basis of the weight matrix.

Embodiment 1

With reference to FIG. 1 to FIG. 9C, a computing system according to Embodiment 1 of the present invention is described. The computing system of Embodiment 1 is a system configured to perform computing processing using a RNN as RC. The RNN in the RC includes an input unit, a reservoir unit, and an output unit. The input unit, the reservoir unit, and the output unit correspond to an input layer, a hidden layer, and an output layer. The computing processing is, for example, nonlinear operation, time series signal processing, or machine learning related to the input signals of tasks to be identified. The structure of the reservoir unit of the RC in the computing system of Embodiment 1 is unique. A computing method of Embodiment 1 is a method including steps that a computer executes in the computing system of Embodiment 1.

Figure 2:
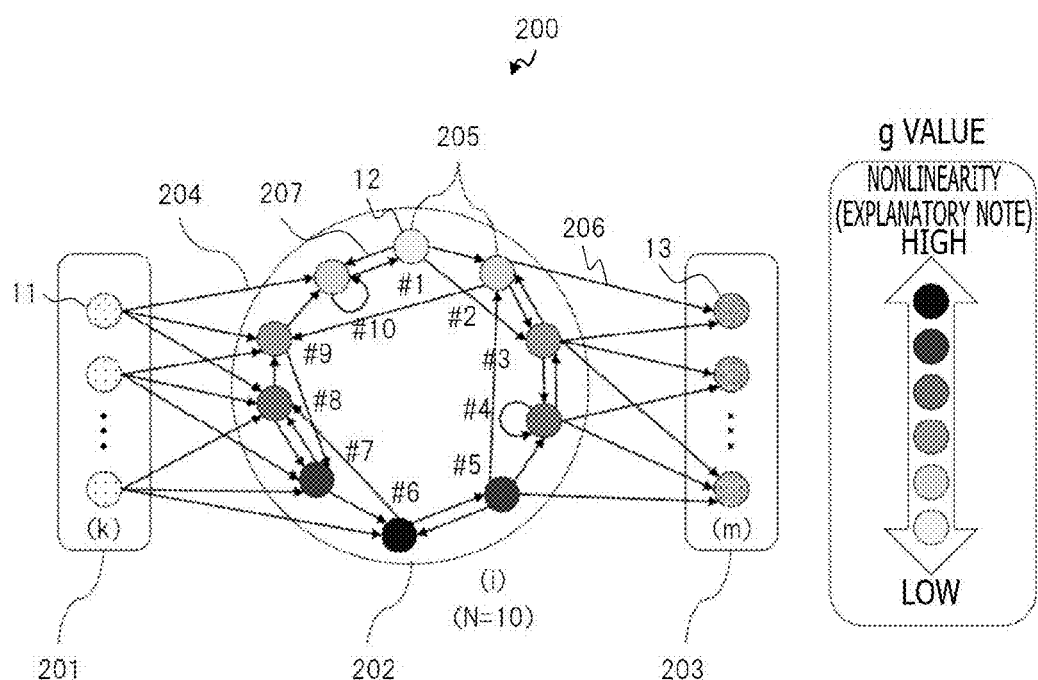
FIG. 2 is a diagram illustrating the structural concept of RC in Embodiment 1.

In the computing system of Embodiment 1, a plurality of nodes that form the network of the reservoir unit are circularly connected to each other, and the g value of each node is periodically set on the circle (FIG. 2 described later). The node-to-node connections are determined by a weight matrix. The g value, in other words, a nonlinearity parameter is a value that designates the nonlinearity of the activation function of a node. The computing system creates, in the weight matrix, for example, the circular network with the plurality of nodes connected to each other in order of consecutive numbers (node numbers) given thereto. The computing system creates, in weight matrix creation, the weight matrix so that nodes having closer node numbers, that is, nodes being more closely arranged on the circle have larger weights. Note that, the node-to-node connections are stochastic and are large or small in weight. The circular network is formed with the node having the first number and the node having the final number connected to each other.

With this, the computing system can achieve, in the RC, signal identification (for example, character recognition or voice recognition) with high accuracy irrespective of signal conversion characteristics desired for tasks (corresponding input signals). With this, the performance of the computing system can be enhanced from the one in the related art example.

[Computing System]

Figure 1:
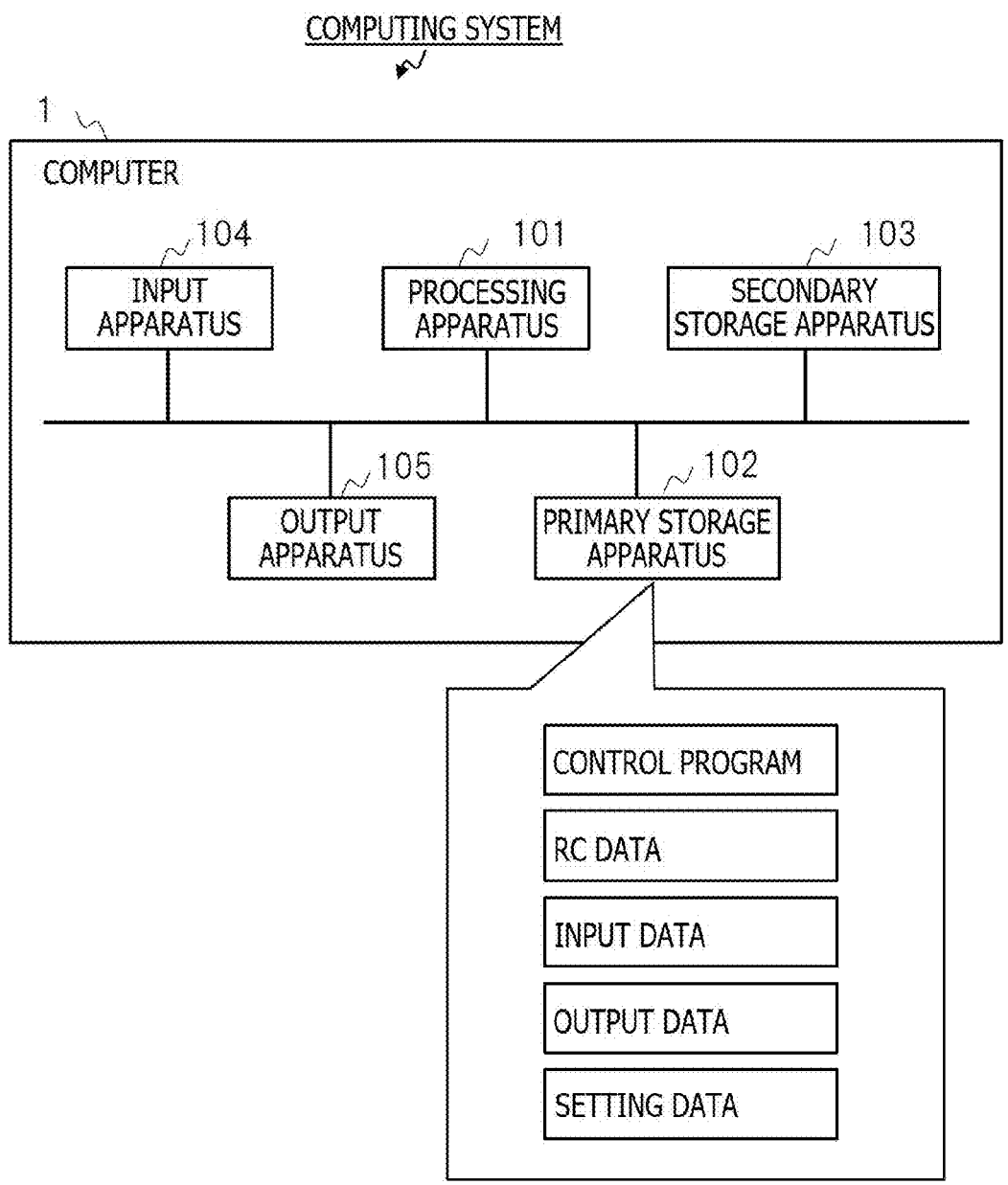
FIG. 1 is a diagram illustrating the configuration of a computing system according to Embodiment 1 of the present invention.

FIG. 1 illustrates the functional block configuration of the computing system of Embodiment 1. The computing system of Embodiment 1 includes a computer 1. To the computer 1, a general PC or server can be applied, for example. The computer 1 includes a processing apparatus 101, a primary storage apparatus 102, a secondary storage apparatus 103, an input apparatus 104, and an output apparatus 105 that are connected to each other through a bus or the like. A user operates the computer 1 to use a computing function using the RC, for example, a character recognition or voice recognition function. For example, the user inputs information or instructions using the input apparatus 104, and confirms information or the like using the output apparatus 105.

The processing apparatus 101 is a part including an integrated circuit, such as a CPU, configured to execute the control of the entire computing system, computation, the recording and reading of data, and the like. The processing apparatus 101 executes, for example, processing in accordance with a control program using the primary storage apparatus 102 or the like, to thereby achieve the computing function using the RC. The primary storage apparatus 102 is an apparatus configured to temporarily store control programs that the processing apparatus 101 executes, data that the processing apparatus 101 processes, processing result information, and the like. The secondary storage apparatus 103 is an apparatus configured to store those data, which the processing apparatus 101 handles, in the long term.

The input apparatus 104 also functions as a connection unit for inputting, to the computing system, signals or data to be processed by computation. The input unit 104 is connected to or incorporates a sensor, a communication apparatus, an external storage medium, or the like. Further, the input apparatus 104 includes a human machine interface that is used by the user to set parameters necessary for computation or to input execution instructions, such as a mouse or a keyboard. The output apparatus 105 also functions as a connection unit for outputting information on, for example, input signals or processed identification results to outside of the computing system. The output apparatus 105 is connected to or incorporates a motor, a communication apparatus, a display, a speaker, or the like.

At least one of the primary storage apparatus 102 and the secondary storage apparatus 103 stores control programs, RC data, input data, output data, setting data, and the like. The control programs are programs for achieving the functions of the computing system. The RC data includes RC model data and learning data. The input data is data on, for example, input signals to the RC. The output data is data on output signals from the RC, recognition result information, or the like. The setting data is data on setting files such as system setting information, user setting information, or the like.

[Reservoir Unit]

FIG. 2 is a diagram illustrating the structural concept of the RC in Embodiment 1. RC 200 includes an input unit 201, a reservoir unit 202, and an output unit 203. The reservoir unit 202 includes, as a plurality of nodes 12, circularly connected nodes 12 having periodic nonlinearity.

A plurality of nodes 11 of the input unit 201 are each connected to some of the nodes 12 of the reservoir unit 202 by a link 204 represented by the unidirectional arrow. The connections by the link 204 are defined by an input weight matrix. A plurality of nodes 13 of the output unit 203 are each connected to some of the plurality of nodes 12 of the reservoir unit 202 by a link 206 represented by the unidirectional arrow. The connections by the link 206 are defined by an output weight matrix. The links 204 and 206 and a link 207 are node-to-node connections. A pair 205 represents an example of a pair of the two adjacent nodes 12 on the circle for the purpose of description. The link 207 represented by the unidirectional arrow indicates the connections between the nodes 12. The connections by the link 207 are defined by a weight matrix (also referred to as "reservoir unit weight matrix").

The plurality of nodes 12 of the reservoir unit 202 are each a nonlinear operation node. The degree of the nonlinearity of each of the nodes 12 is set with the g value of each of the nodes 12. The plurality of nodes 12 of the reservoir unit 202 are circularly connected to each other schematically. The number of the nodes 12 is indicated by N. In the present example, for the convenience of description, the reservoir unit 202 includes, as the plurality of nodes 12, the ten nodes 12 (N=10) given with numbers #1 to #10 for identification. For example, the pair 205 is a pair of the node 12 having the number #1 and the node 12 having the number #2. The number N of the nodes 12 of the reservoir unit 202 is not limited and may actually be a larger value such as thirty-two or one hundred twenty-eight. Numbers, IDs, or the like are given to the nodes 12 in terms of information processing, and may be given in another aspect or omitted.

The connections between the plurality of nodes 12 of the reservoir unit 202 are determined by the weight matrix. The computing system sets the weight matrix. The weight matrix defines a weight of each pair of the two nodes 12 of all the nodes 12. The weight matrix can be represented as a heat map as in FIG. 3 described later.

The nodes 12 each have the "g value" as a parameter indicating the degree of the nonlinearity of the activation function of the node 12. In FIG. 2, the g value corresponding to the nonlinearity of the nodes 12 is expressed by gradation between white and black. With regard to the g value, brighter colors indicate lower nonlinearity and darker colors indicate higher nonlinearity. In the present example, the node 12 having the number #1 has the lowest nonlinearity, and the node 12 having the number #6 has the highest nonlinearity.

A pair of the nodes 12 closely arranged on the circle, for example, the pair 205 of the nodes 12 having the number #1 and the number #2 has a large weight. A pair of the nodes 12 arranged away from each other on the circle, for example, a pair of the nodes 12 having the number #1 and the number #6 has a small weight. A certain node 12 (for example, the node 12 having the number #1) has a large weight with each of the nodes 12 adjacent thereto on the circle (for example, the nodes 12 having the number #2 and the number #10). Note that, for example, the node 12 having the number #1 and the node 12 having the number #3 are connected to each other, which means that the nodes 12 having one or more of the nodes 12 therebetween may be connected to each other on the circle. Further, a node may have a link extended from the node in question to be connected thereto, like the node 12 having the number #10, for example.

[Weight Matrix]

Figure 3:
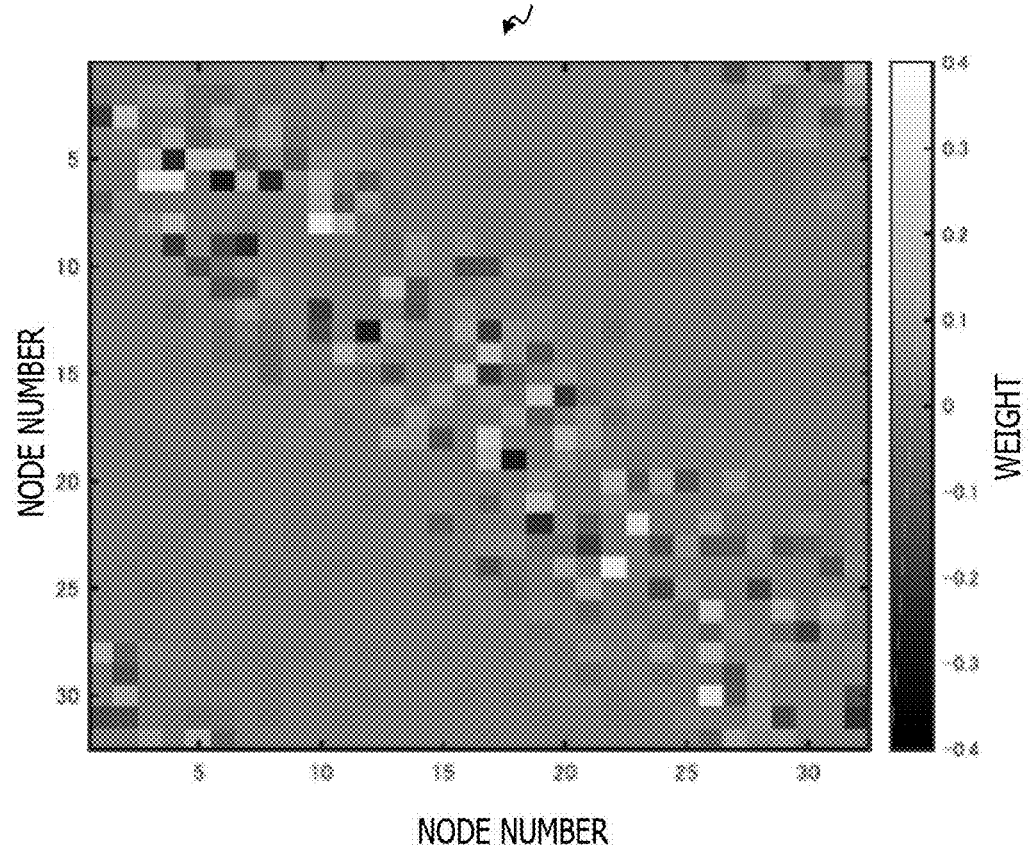
FIG. 3 is a diagram illustrating a heat map corresponding to a weight matrix of nodes of a reservoir unit of the RC in Embodiment 1.

FIG. 3 relates to the RC 200 in FIG. 2, and illustrates the heat map corresponding to the weight matrix of the reservoir unit 202. In the heat map, weights between the nodes 12, which are circularly connected to each other, of the reservoir unit 202 are expressed by gradation. In the heat map, on the horizontal axis and the vertical axis, the node numbers of the nodes 12 (1 to 32 in the present example) are provided. In the present example, the gradation values indicating the weights have gray indicating zero, brighter colors indicating larger values in a positive direction, and darker colors indicating larger values in a negative direction. The positive direction is, for example, a right-handed direction (clockwise direction) on the circle, and the negative direction is a counterclockwise direction on the circle. In the heat map, the weights are large in a diagonal region from the upper left to the lower right, a lower left region, and an upper right region.

[Processing Flow]

Figure 4:
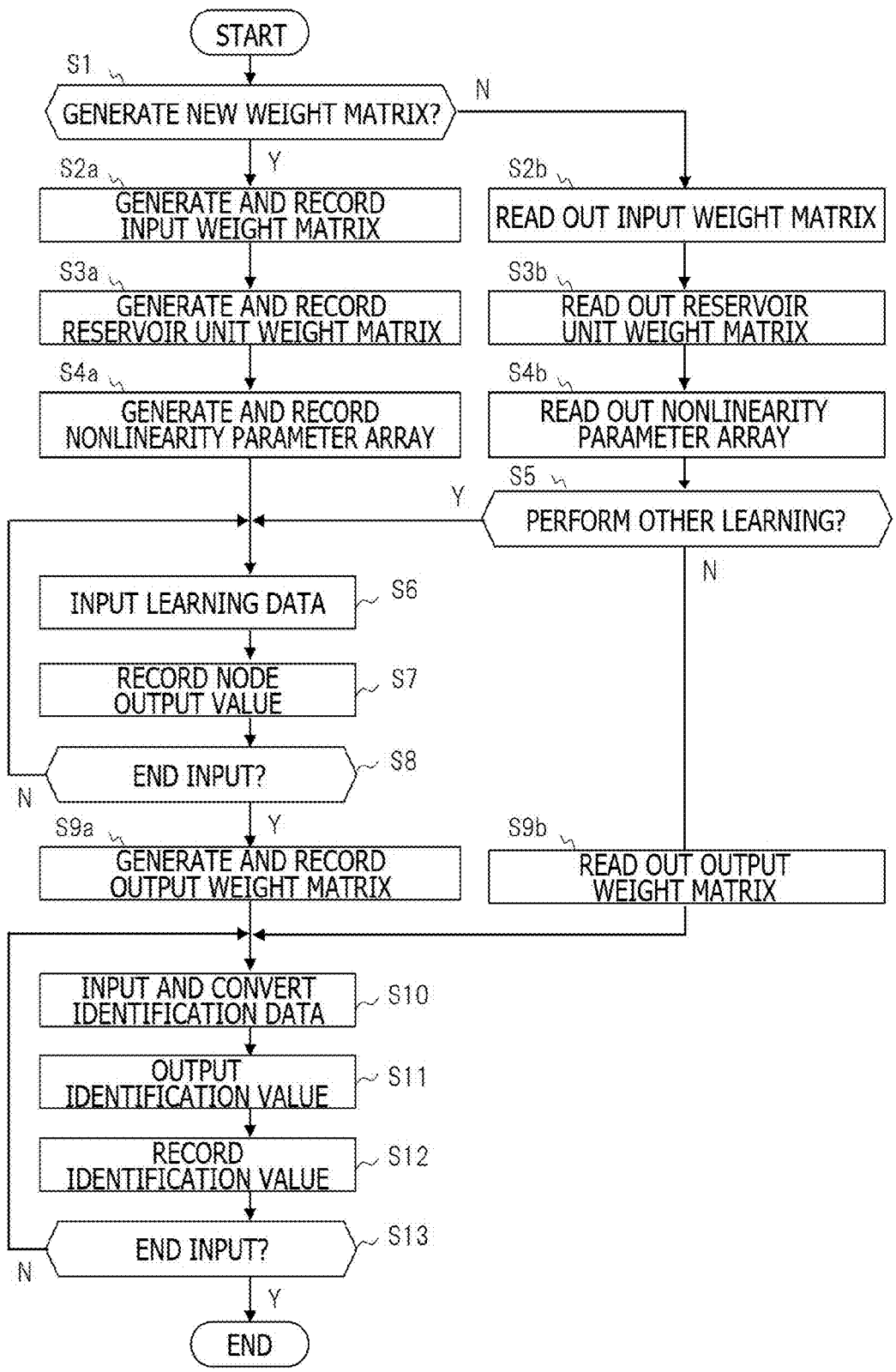
FIG. 4 is a diagram illustrating the processing flow of the computing system of Embodiment 1.

FIG. 4 illustrates the processing flow of the computing system of Embodiment 1. FIG. 4, in which Steps S1 to S13 are illustrated, is now described in order of the steps. The computer 1 starts the processing with a trigger being a signal from the input apparatus 104, specifically, the start of data input or specific operation with a mouse or the like.

In Step S1, the processing apparatus 101 reads out a signal from the input apparatus 104 or a specific description of a setting file recorded on the secondary storage apparatus 103. Then, the processing apparatus 101 confirms, on the basis of the signal or the specific description, whether to generate a new weight matrix in the RC. In other words, the processing apparatus 101 determines whether or not to generate input connections and internal connections in the RC network. Input connections are each a portion connecting the nodes 11 of the input unit 201 to the nodes 12 of the reservoir unit 202, such as the link 204 in FIG. 2, and are defined by the input weight matrix. Internal connections are each a portion connecting the nodes 12 of the reservoir unit 202 to each other, such as the link 207 in FIG. 2, and are defined by the weight matrix as in FIG. 3. Output connections are each a portion connecting the nodes 12 of the reservoir unit 202 to the nodes 13 of the output unit 203, such as the link 206, and are defined by the output weight matrix. In a case where it has been selected to generate a new weight matrix (Y) in Step S1, the processing proceeds to Step S2a, while in a case where it has not been selected to generate a new weight matrix (N), the processing proceeds to Step S2b.

In Step S2a, the processing apparatus 101 generates an input weight matrix indicating weights between data to be processed and each node, and stores the input weight matrix to the RC data of the primary storage apparatus 102 and the secondary storage apparatus 103. In Step S3a, the processing apparatus 101 generates a reservoir unit weight matrix indicating weights between the nodes, and stores the reservoir unit weight matrix to the RC data of the primary storage apparatus 102 and the secondary storage apparatus 103. In Step S4a, the processing apparatus 101 generates a nonlinearity parameter array, and records the nonlinearity parameter array on the RC data of the primary storage apparatus 102 and the secondary storage apparatus 103. The nonlinearity parameter array is an array that defines the g value of each of the nodes 12 of the reservoir unit 202.

Meanwhile, in Step S2b, the processing apparatus 101 reads out an input weight matrix recorded on the secondary storage apparatus 103. In Step S3b, the processing apparatus 101 reads out a reservoir unit weight matrix recorded on the secondary storage apparatus 103. In Step S4b, the processing apparatus 101 reads out a nonlinearity parameter array recorded on the secondary storage apparatus 103.

In Step S5, the processing apparatus 101 reads out a signal from the input apparatus 104 or a specific description of the setting file recorded on the secondary storage apparatus 103, and confirms whether to perform other learning. In a case where other learning is to be performed (Y), the processing proceeds to Step S6, while in a case where other learning is not to be performed (N), the processing proceeds to Step S9b.

[Input Weight Matrix]

The input weight matrix indicates a weight between an i-th node 12 of the reservoir unit 202 and a k-th data array (the corresponding node 11) of the input unit 201 as a weight $W^{in}_{ik}$. The processing apparatus 101 randomly determines the value of each element in the input weight matrix in terms of the weight $W^{in}_{1k}$. In the example of Embodiment 1, half of the elements of the array are set to zero, and the remaining half of the elements are set to values stochastically selected from a normal distribution having a mean value of zero and a standard deviation of 0.33.

[Reservoir Unit Weight Matrix]

The reservoir unit weight matrix indicates a weight between the i-th node 12 and a j-th node 12 as a weight $W^{res}_{ij}$. i and j are values within a range of 1 to N. The processing apparatus 101 determines the value of each element in the reservoir unit weight matrix in terms of the weight $W^{res}_{ij}$ by the following procedures. In the example of Embodiment 1, the processing apparatus 101 generates a two-dimensional array $W^{rand}_{ij}$ having column elements with random values. Half of the elements of the two-dimensional array $W^{rand}_{ij}$ are set to zero, and the remaining half of the elements are set to values stochastically selected from a normal distribution having a mean value of zero and a standard deviation of 0.33. In a case where the number N of the nodes 12 of the reservoir unit 202 is thirty-two (N=32), for example, the two-dimensional array $W^{rand}_{ij}$ is equal to the heat map illustrated in FIG. 11.

Next, the processing apparatus 101 determines each element value so that a vector having as many elements as the number N of the nodes 12 of the reservoir unit 202 takes the maximum value at the center and element values smaller than the value at the center at the edge. The center indicates an element whose element number corresponds to half of the number of elements.

In the example of Embodiment 1, in this case, a Gaussian function that takes the maximum value of one is used. Note that, as the function, other than the one above, a triangle wave, a square wave, or the like can be used.

The processing apparatus 101 duplicates the above-mentioned vector to obtain as many vectors as the number N of the nodes 12 while cyclically shifting the vectors by one element, and connects the vectors to each other in order of the shift amounts, to thereby generate a two-dimensional array. Moreover, the processing apparatus 101 cyclically shifts, in the above-mentioned connection direction, half of the number N of the nodes 12 of the above-mentioned two-dimensional array, to thereby obtain a two-dimensional array in which a diagonal element takes the maximum value in each row. The two-dimensional array is referred to as "two-dimensional array $W^{gauss}_{ij}$."

Finally, the processing apparatus 101 computes the element product of $W^{rand}_{ij}$ and $W^{gauss}_{ij}$, to thereby generate the weight $W^{res}_{ij}$ designed so that the nodes 12 closer to each other have larger expected values of weight absolute values in the circular network of the reservoir unit 202.

"Expected value" used herein indicates a value to which weights determined by randomly determining the connections between the nodes 12 a plurality of times converge by averaging.

The heat map of FIG. 3 indicates the reservoir unit weight matrix generated by such processing when N=32. In the reservoir unit weight matrix, it is found that weights having large absolute values are often set in the diagonal element (the diagonal region from the upper left to the lower right), in which the weights between the adjacent nodes 12 are indicated, and in the vicinity of (i,j)=(1, 32) and (32, 1) (the lower left region and the upper right region).

With the reservoir unit weight matrix generated by the above-mentioned processing procedures, the plurality of nodes 12 of the reservoir unit 202 are created to form the circle as illustrated in FIG. 2. In this case, the weights are determined so that a pair of the nodes 12 having closer node numbers has a larger expected value of a weight absolute value. Note that, the node 12 having the first number #1 is connected to the adjacent node 12 having the next number #2, and is also connected to the node 12 having the final number #N=#10, which is adjacent to the node 12 having the number #1 on the opposite side. The node 12 having the final number #N=#10 is adjacent and connected to the node 12 having a number #N−1 and the node 12 having the number #1. With this, the circle is formed. In general, the node 12 having a certain number #i is adjacent and connected to (in other words, has strong connections with) the node 12 having a number #i+1 and the node 12 having a number #i−1. The processing apparatus 101 performs the processing in ascending order of the node numbers, for example, and connects the node 12 having the final number #N to the node 12 having the first number #1, to thereby form the circle.

As pairs of the nodes 12 having close node numbers, for example, with regard to the node 12 having the number #1, a pair with the node 12 having the number #2 and a pair with the node 12 having the number #10 are given. There are pairs in a positive direction corresponding to the ascending order of the node numbers (#1→#2→#3→ . . . ) and pairs in a negative direction corresponding to the descending order of the node numbers (#1→#10→#9 . . . ). The weight matrix is determined so that, with regard to pairs in any direction, a pair of the nodes 12 closely arranged has a weight larger than a weight between the nodes 12 arranged away from each other, that is, has a relatively large weight. Note that, a connection having a relatively large weight is sometimes referred to as "strong connection," and a connection having a relatively small weight is sometimes referred to as "weak connection."

In Embodiment 1, with the weights of the nodes 12 of the reservoir unit 202 designed in this way, the strong connections and the weak connections are formed in the same network so that the nodes 12 having greatly different node numbers, in other words, the nodes 12 away from each other on the circle are prevented from directly affecting each other.

Further, in Embodiment 1, the g value of the group of the nodes 12 of the reservoir unit 202 is designed so that, in the circular connection, in the order of the node numbers, in other words, in the circumferential direction, the g value periodically changes in a range of the minimum value to the maximum value. For example, the node 12 having the first number #1 has the minimum g value, and the g value gradually increases toward the node 12 having the number #6 that is opposite to the node 12 having the number #1 on the circle in the positive direction. The node 12 having the number #6 has the maximum g value. Then, the g value gradually decreases from the node 12 having the number #6 to the node 12 having the final number #N=#10 and the node 12 having the first number #1.

The above-mentioned nonlinearity parameter array is a vector indicated by a non-negative element $g_i$ with respect to the i-th node 12. In general, RC uses sigmoidal functions as node computing functions called "activation function." Similar to this, in the example of Embodiment 1, as an activation function, a tanh function including a nonlinearity parameter array is used as a sigmoidal function. With the use of a tanh function, the output value of the i-th node 12 at a certain time point t is computed by Expression 1 below.

$$u_i(t) = \frac{\tanh(x_i(t))}{\tanh(g_i)} \qquad \text{Expression 1}$$

Here, $x_i(t)$ is an input value to the i-th node 12 at the time point t, and is obtained with the use of Expression 2 below.

$$x_i(t) = \sum_k g_i W^{in}_{ik} I_k + \sum_j W^{res}_{ij} u_j(t-1) \qquad \text{Expression 2}$$

In Expression 2, $g_i$ is a non-negative parameter (g value) for adjusting the nonlinearity of the i-th node 12, and is also referred to as "nonlinearity parameter array." The input weight matrix $W^{in}_{ik}$ is the weight between the i-th node 12 and the k-th data of the input unit 201. $I_k$ is the value of the k-th data of the input unit 201. As expressed by Expression 1 and Expression 2, the nonlinearity parameter array $g_i$ in the example of Embodiment 1 functions as a parameter for adjusting the intensity of a signal to be input from the input unit 201 to each of the nodes 12 of the reservoir unit 202. As the value of the nonlinearity parameter array $g_i$ increases, the signal conversion nonlinearity increases.

As the value of the above-mentioned nonlinearity parameter array $g_i$ increases, the nonlinear effect in computation by the reservoir unit 202 increases. Thus, when the g value ($g_i$) that takes a periodic value with respect to the numbers of the nodes 12 (in other words, the positions on the circle) is set, a structure in which the adjacent nodes 12 on the circle (that is, the two nodes 12 having a strong connection therebetween) have similar nonlinearity can be formed. In the example of Embodiment 1, the nonlinearity parameter array $g_i$ is defined by Expression 3 below with the maximum value that gi may take being $10^2$ and the minimum value that $g_i$ may take being $10^{-1}$.

$$g_i = \begin{cases} 10^{\left(\frac{6}{N}i-1\right)} & (i \le N/2) \\ 10^{\left(-\frac{6}{N}i+6\right)} & (i > N/2) \end{cases} \qquad \text{Expression 3}$$

In the case of Expression 3, the plurality of nodes 12 of the reservoir unit 202 are set so that the logarithms of the g value ($\text{Log}_{10}$) are at even intervals on the circle with the periodic characteristic of the g value. Note that, the present invention is not limited to this, and the function of the node number i for determining the above-mentioned nonlinearity parameter array $g_i$ can be freely designed depending on tasks.

Referring back to FIG. 4. In the case where it has been selected to generate a new weight matrix (Y) in Step S1 or in the case where other learning has been selected (Y) in Step S5, the processing in Step S6 is performed. In Step S6, the processing apparatus 101 reads out learning data from the input apparatus 104 or the RC data of the secondary storage apparatus 103, and converts the learning data to node output values using Expression 1 and Expression 2 above. The node output value is a value that is output from the node 12 of the reservoir unit 202 to the node 13 of the output unit 203 (the corresponding data) in FIG. 2.

In Step S7, the processing apparatus 101 records the node output values on the output data of the primary storage apparatus 102 and the secondary storage apparatus 103.

Here, "learning data" means data having the input value $I_k$ in Expression 2 and an ideal output value corresponding to the input.

In Step S8, the processing apparatus 101 confirms whether to end input to the RC. In a case where entire learning data has been input, a case where entire learning-use data designated by the specific description of the setting file recorded on the secondary storage apparatus 103 has been input, or a case where the signal from the input apparatus 104 designates the end of learning (Y), the processing apparatus 101 ends the input of learning data, and proceeds to Step S9a. In a case where the input is not brought to an end (N), the processing returns to Step S6 and is repeated in a similar manner.

In Step S9a, the processing apparatus 101 generates, from the node output values recorded in Step S7, an output weight matrix in which the sum of an error to an ideal output value corresponding to the learning data and a regularization term is minimum. The processing apparatus 101 records the generated output weight matrix on the RC data of the primary storage apparatus 102 and the secondary storage apparatus 103.

Meanwhile, in the case where other learning has not been selected in Step S5, in Step S9*b*, the processing apparatus 101 reads out an output weight matrix recorded on the secondary storage apparatus 103.

[Output Weight Matrix]

The output weight matrix is an array that designates weights between the reservoir unit 202 and the output unit 203. The output weight matrix indicates a weight between the i-th node and m-th data of the output unit 203 as $W^{out}_{im}$ that is a coefficient used in computation of an m-th output value of the output unit 203 at the certain time point t by Expression 4 below.

$$y_m(t) = \sum_i W^{out}_{im} u_i(t) \quad \text{Expression 4}$$

The output weight matrix calculation method is, for example, a method that uses least squares regression to the node output values in learning data input, which have been recorded in Step S7. In a case where a specific nonlinearity is suitable for a task, coefficients only using some node output values are preferably used. Besides, methods that enable learning only using some node output values include a method generally called "Lasso regression." The Lasso regression method is a method that further adds a regularization term to an error of least squares regression. The Lasso regression method provides higher accuracy than least squares regression does in the case where a specific nonlinearity is suitable for a task. In the example of Embodiment 1, with the use of the Lasso regression method, the output weight matrix can be obtained by Expression 5 below.

$$W^{out}_{im} = \underset{W^{out}}{\operatorname{argmin}} \left[ \left( y_m - \sum_i W^{out}_{im} u_i \right) + \lambda \sum_i |W^{out}_{im}| \right] \quad \text{Expression 5}$$

In Expression 5, a term having $\lambda$ is a regularization term that is added by the Lasso regression method. $\lambda$ is a non-negative regularization parameter. Note that, since Lasso regression is difficult to analytically solve, least squares regression is preferably used under conditions where an analysis solution is suitably obtained. As another embodiment, least squares regression may be used. In the case where least squares regression is used, $\lambda=0$ may be set in Expression 5.

In the case of Expression 5, the output weight matrix is determined by least squares regression in which the sum of squares of an error between the linear sum of the output values of the plurality of nodes 12 in learning data input and an ideal output value is minimum. In another mode, the output weight matrix is determined by the Lasso regression method that adds a regularization term to an error between the linear sum of the output values of the plurality of nodes 12 in learning data input and an ideal output value.

After Step S9*a* or Step S9*b*, the processing proceeds to Step S10. In Step S10, the processing apparatus 101 inputs identification data. The identification data is data to be identified by the RC. The processing apparatus 101 inputs an input signal corresponding to the identification data to each of the nodes 12 of the reservoir unit 202 from the input unit 201 using the above-mentioned input weight matrix, and converts the input signals to node output values using the reservoir unit weight matrix and the nonlinearity parameter array described above. Moreover, in Step S11, the processing apparatus 101 outputs identification values from the node output values using the above-mentioned output weight matrix, in other words, outputs recognition result data from the output unit 203. Further, in Step S12, the processing apparatus 101 records the identification values on the output data of the primary storage apparatus 102 and the secondary storage apparatus 103.

In Step S13, the processing apparatus 101 confirms whether to end the input of identification data. In a case where the entire identification data described above has been input, a case where entire identification data designated by the specific description of the setting file recorded on the secondary storage apparatus 103 has been input, or a case where the signal from the input apparatus 104 designates the end of identification (Y), the processing apparatus 101 ends the input of identification data. In a case where the input is not brought to an end (N), the processing returns to Step S10 and is repeated in a similar manner.

[Features and Effects]

Figure 5A:
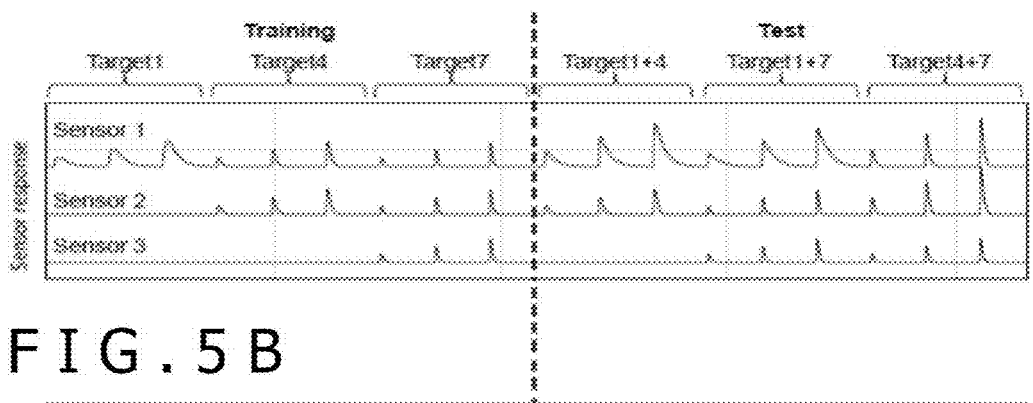
FIGS. 5A and 5B are diagrams illustrating three types of sensor response values and the individual response values of three types of measurement targets in Embodiment 1.
Figure 5B:
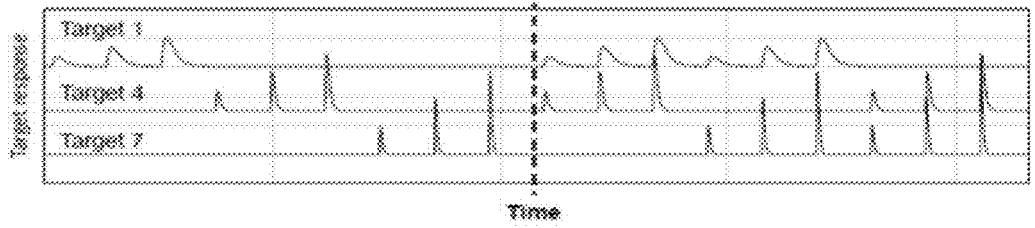

With reference to FIGS. 5A, 5B, 6A, and 6B, and the like, the features and effects of Embodiment 1 are described in more detail. FIGS. 5A and 5B illustrate, as an example of identification using the RC in the computing system of Embodiment 1, the sensor response values of three types of sensors and the individual response values of three types of measurement targets. FIG. 5A illustrates the sensor response values, and FIG. 5B illustrates the individual response values of the measurement targets. In the present example, as input signals to the RC, the response values of the three types of sensors are used. In FIG. 5A, the horizontal axis indicates time and the vertical axis indicates sensor response value. The three types of sensors are represented by Sensor 1, Sensor 2, and Sensor 3. These sensor response values indicate values actually simulated with the use of a computer. In FIG. 5B, the vertical axis indicates measurement target response value. The three types of measurement targets are represented by Target 1, Target 4, and Target 7.

Figure 6A:
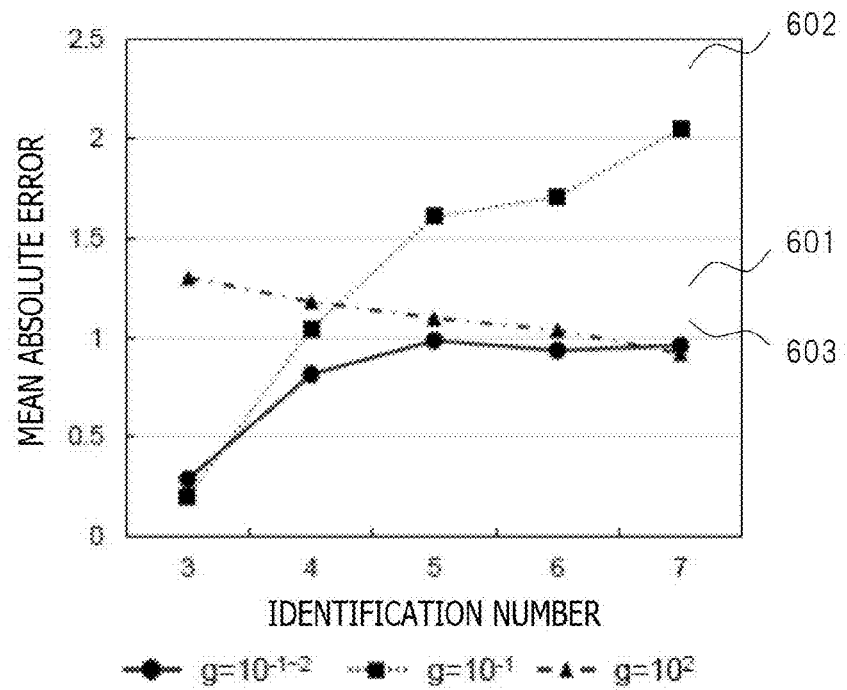
FIGS. 6A and 6B are diagrams illustrating the mean prediction errors of individual target strengths in a quantification and identification task in Embodiment 1.
Figure 6B:
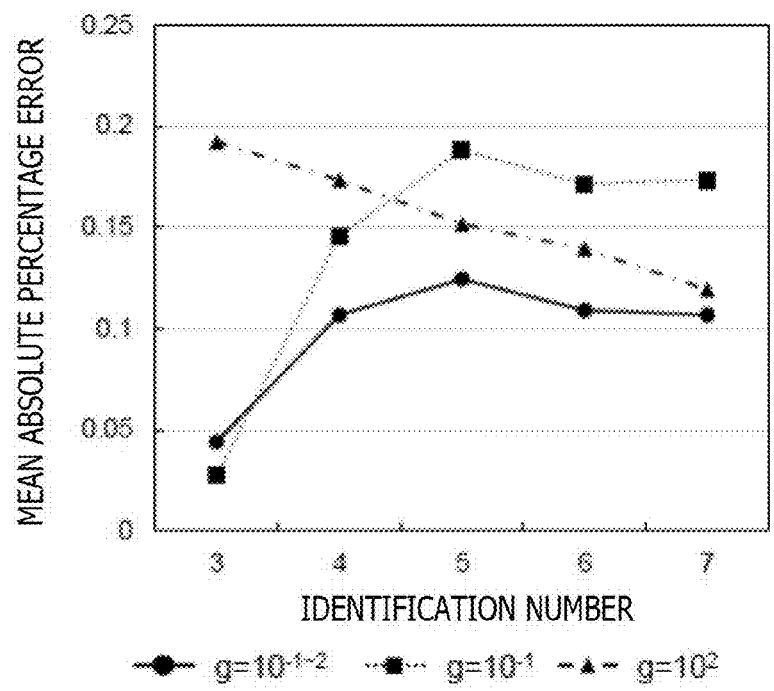

FIGS. 6A and 6B illustrate the mean prediction errors of individual target strengths in a quantification and identification task in Embodiment 1. The quantification and identification task is a task for quantifying the strengths of measurement targets. The individual target strengths are the strengths of the three types of measurement targets.

One of the features of Embodiment 1 is that, as illustrated in FIG. 2, in the same network of the reservoir unit 202, the signal processing by the plurality of nodes 12 being different from each other in nonlinearity, in particular, having periodic nonlinearity is achieved. The effects of the feature are evaluated with the use of the task for quantifying the strengths of measurement targets from the plurality of sensor response values described above.

The type and strength of a measurement target can be identified from a sensor response value. With regard to the measurement target, for example, a measurement signal such as an image, a sound, a vibration, a smell, or a taste, or a feature quantity such as amplitude subjected to signal processing can be utilized as the sensor response value.

In FIGS. 5A and 5B, as a time-response function representing each individual sensor response value, a double exponential waveform as expressed by Expression 6 below is used.

$$f_{so}^{DE}(t) = \frac{(e^{-\alpha_{so}t} - e^{-\beta_{so}t})}{(e^{-\alpha_{so}t^{max}} - e^{-\beta_{so}t^{max}})} \quad \text{Expression 6}$$

Here, s and o in Expression 6 indicate sensor type (s) and measurement target type (o). α and β are constants for determining time response characteristics. The maximum value of the waveform is assumed to be determined on the basis of the type of a measurement target and the strength thereof, and is standardized to be independent of α and β. At this time, $t^{max}$ is a time point at which the waveform takes the maximum, and can be expressed by Expression 7 below.

$$t^{max} = \frac{\ln(\alpha/\beta)}{\alpha - \beta} \quad \text{Expression 7}$$

Moreover, Expression 6 takes a negative value at a time point before the sensors respond (t<0). Thus, a Heaviside step function in Expression 8 below is used so that a value at a time point before stimulation takes zero.

$$H_{1/2}(t) = \begin{cases} 1 & (t > 0) \\ 1/2 & (t = 0) \\ 0 & (t < 0) \end{cases} \quad \text{Expression 8}$$

Further, the strength of a measurement target is indicated by $c_o$, and a response strength with respect to the strength $c_o$ is set to a sigmoidal function in Expression 9 below.

$$S_{so}(c_o) = \frac{S_{so}^{max}}{1 + \exp(-\gamma \ln(c_o) + c^{shift})} \quad \text{Expression 9}$$

Here, $S^{max}_{so}$, $\gamma$, and $c^{shift}$ in Expression 9 are constants for determining function sensitivities, thresholds, and dynamic ranges. $\gamma$ and $c^{shift}$ are constant ($\gamma=1$ and $c^{shift}=1$) irrespective of the combinations of measurement targets and sensors. The product of Expression 6, Expression 8, and Expression 9 above is taken, and the sum of individual responses are taken in a case where there are a plurality of measurement targets. Then, the time-response function of an s-th sensor is expressed by Expression 10 below with a sensor response start time point being to.

$$I_s(t) = \sum_o S_{so} f_{so}^{DE}(t - t_0) H_{1/2}(t - t_0) + I_{noise} \quad \text{Expression 10}$$

In Expression 10, $I_{noise}$ is a noise term having a normal distribution and corresponds to noise in measurement.

In the example of Embodiment 1, the strengths $c_o$ of the measurement targets are the tree levels of strengths at even intervals in a logarithmic scale ($c_o=1$, 3.2, and 10). $S^{max}_{so}$, which is a constant in Expression 9, is set as illustrated in Table 1 of FIG. 7A. Table 1 illustrates the combinations of the three types of sensors (sensor type (s)) and seven types of measurement targets (target type (o)). With regard to the seven types of measurement targets (target type (o)), $S^{max}_{so}$ is represented by 0 or 1 on the basis of the three-bit representation in the binary system. $S^{max}_{so}$ is set so that the single sensor responds to the three types of measurement targets (o=1 to 3), the two types of sensors respond to the remaining three types of measurement targets (o=4 to 6), and the three types of sensors responded to the remaining one type of measurement target (o=7).

Further, in Expression 6, the coefficients (αso and βso) related to the time response characteristics are set as illustrated in Table 2 of FIG. 7B. Table 2 illustrates correspondences between the coefficients (αso and βso) and the seven types of measurement targets (Target type(o)). The coefficients (αso and βso) are set to each sensor so that, with regard to a measurement target to which a larger number of sensors responds, a faster time response is made, that is, $\alpha_{so}$ and $\beta_{so}$ having larger values are set.

FIG. 5A illustrates the extracted response values of the sensors (s=1, 2, and 3) related to the three types of measurement targets (o=1, 4, and 7) of the seven types of measurement targets (Target 1 to Target 7). In the graph, a period on the left side of the time point at the center broken line indicates the response data of single input, and a period on the right side thereof indicates the response data of two-type mixed input (for example, a combination of o=1 and 4).

In the quantification and identification task, the computer 1 learns conversion to a response to each measurement target illustrated in FIG. 5B from the response data of the above-mentioned single input (corresponding to Steps S6 to S8 and S9a in FIG. 4). Then, in the quantification and identification task, the computer 1 outputs identification results in the above-mentioned two-type mixed input (corresponding to Steps S10 to S13), and evaluates the quantitativity.

FIGS. 6A and 6B illustrate the mean prediction errors of the individual measurement target strengths in the quantification and identification task. FIG. 6A illustrates mean absolute errors. FIG. 6B illustrates mean absolute percentage errors. The identification number on the horizontal axis indicates, with the numbers representing the measurement target types in Table 1 of FIG. 7A (o=1 to 7), the maximum number of measurement targets that are used in learning and identification. Thus, as the identification number increases, the task difficultly increases. In FIGS. 6A and 6B, a case where each of the nodes 12 of the reservoir unit 202 takes the nonlinearity parameter array $g_i$ (g value) having a periodic value, that is, a case 601 corresponding to the structure example of the RC 200 of Embodiment 1 is plotted by the solid line and the circles. The case 601 has $g=10^{-1}$ to $10^2$. Further, a case 602 having a constant value for all the nodes 12 of the reservoir unit 202, namely, $g=10^{-1}$ is plotted by the dotted line and the squares. A case 603 having a constant value for all the nodes 12, namely, $g=10^{-2}$ is plotted by the long dashed short dashed line and the triangles.

In the example of Embodiment 1, as the value of the nonlinearity parameter array $g_i$ increases, the signal conversion nonlinearity increases as described above. Thus, the case 602 having $g=10^{-1}=0.1$ is closer to linear transformation than the case 603 having $g=10^2=100$ is. The reason why identification with the identification number 3 has the smallest error in the case 602 having $g=10^{-1}$ is as follows. Specifically, the measurement targets having o=1 to 3 correspond to the sensors having s=1 to 3 on a one-to-one basis as in Table 1 of FIG. 7A, and hence it is preferred that, in the quantification of the strength of each measurement target, a signal from the corresponding sensor be used as it is.

However, with regard to the measurement targets having o=4 to 7, it is necessary to compositely analyze signals from the plurality of sensors. Thus, with the case 602 having $g=10^{-1}$, that is, with linear transformation, identification is difficult.

Meanwhile, in contrast to the case 602 having $g=10^{-1}$, the case 603 having $g=10^2$, which has a large nonlinear transformation effect, has the smallest error in a case where all the seven types of measurement targets are identified, which corresponds to the identification number 7. As the identification number decreases, the error increases. This is because the strong signal conversion nonlinearity adversely affects the quantitativity in the cases where the identification number is small and linear transformation is thus preferred.

As described above, the RC of the comparative example (FIG. 10) can achieve only one of linear transformation and nonlinear transformation of a certain task with high accuracy. In a case where the identification number is 3, conversion having high linearity such as the case 602 having $g=10^{-1}$ is suitable. In a case where the identification number is 7, conversion having high nonlinearity such as the case 603 having $g=10^2$ is suitable. In the comparative example, a case where the characteristics of a linear or nonlinear network suitable for a certain task are unknown cannot be dealt with.

[Design of Reservoir Unit]

As described above, the inventor of the present invention has found that in the quantification and identification task, a suitable nonlinearity parameter in the RC differs depending on a relationship between a target to be identified and sensor characteristics. The inventor of the present invention has studied a suitable reservoir unit structure of the RC on the basis of the finding. The inventor of the present invention has studied a reservoir unit structure of the RC that enables to identify an identification target with high accuracy even in a case where the identification target or characteristics, that is, parameters suitable for computation are not known in advance. As a result, the inventor of the present invention has designed the structure as in FIG. 2 described above. The reservoir unit 202 includes the group of the circularly connected nodes 12 having the periodic nonlinearity parameter. The reservoir unit 202 has the weight matrix for determining the weights between the nodes 12, in which a weight between the nodes 12 closely arranged on the circle is larger than a weight between the nodes 12 arranged away from each other on the circle. The reservoir unit 202 is set so that, on the circle of the plurality of nodes 12, the g value of each of the nodes 12 periodically changes between the minimum value and the maximum value.

In the example that the inventor of the present invention has studied, in a case where the number of identification targets to be identified is large, a model having high nonlinearity achieves high accuracy. Further, in a case where the identification number is small, a model having high linearity achieves high accuracy. Thus, the inventor of the present invention has designed a suitable reservoir unit structure that can flexibly deal with both linearity and nonlinearity, in other words, various tasks different from each other in degree of nonlinearity. As a result, there has been obtained the structure of the reservoir unit 202 as in FIG. 2, which is different from the comparative example (FIG. 10) that is the model simply including the two types of nodes 32, namely, the linear operation nodes 32A and the nonlinear operation nodes 32B in a mixed manner.

The reservoir unit 202 has the circular network structure and the structure in which the nodes 12 on the circle have the periodic nonlinearity parameter. The reservoir unit 202 is the model having the circular structure having the continuous and periodic distribution from linearity to nonlinearity, which is indicated by the g value. The RC 200 has signal conversion having nonlinearity, which causes continuous change, in the single network of the reservoir unit 202. Thus, in the case 601 corresponding to the above-mentioned RC 200, with regard to all the identification numbers in FIGS. 6A and 6B, the measurement target strengths are able to be quantified with errors equal to or smaller than those of the case 602 having $g=10^{-1}$ and the case 603 having $g=10^2$ of the related art examples. In the case 601 corresponding to the RC 200, with regard to the identification number 3 or 7, the quantification result had an error equal to that in the related art with a suitable nonlinearity parameter. Moreover, with regard to the identification number 4, 5, or 6, the quantification result had an error smaller than those in the cases of the related art (the cases 602 and 603). This tendency is common to the absolute error evaluation method that includes a case where the true value of a measurement target strength is zero in calculation, which is illustrated in FIG. 6A, and the absolute percentage error evaluation method that corrects a true value difference of measurement target strengths in calculation, which is illustrated in FIG. 6B.

Consequently, the computing system of Embodiment 1 achieves identification using the single unique network of the reservoir unit 202 as in FIG. 2 without the need of grasping the degree of nonlinearity preferred for a signal processing task in advance. As a result, according to Embodiment 1, even in a case where it is difficult to grasp the number of elements to be identified or each response characteristic in advance, identification is achieved with higher accuracy. According to the computing system of Embodiment 1, identification is achieved with high accuracy even in a case where it is unknown whether a task is a task for which linear transformation is desired or a task for which nonlinear transformation is desired, in other words, irrespective of signal conversion characteristics desired for the task.

[Structure of Reservoir Unit (1)]

With reference to FIGS. 8A to 8E and the like, some descriptions on the structure and features of the reservoir unit 202 of Embodiment 1 are added. As in FIG. 2 described above, the plurality of nodes 12 on the circle of the reservoir unit 202 have the periodic g value. The network structure of the reservoir unit 202 has a feature in that the nodes 12 having closer g values have larger weights, in other words, stronger connections therebetween. The connections between the nodes 12 and the weight matrix can also be described as follows. The nodes 12 arranged on the circle to be adjacent to each other in the positive direction are indicated by nodes #i, #i+1, #i+2, and the like, for example. The weight matrix is determined so that the expected value of the absolute value of the weight of a pair of the node #i and the node #i+1, which are adjacent to each other, is larger than the expected value of the absolute value of the weight of a pair of the node #i and the node #i+2, which are adjacent to each other with one node therebetween. The relationships of nodes #i, #i−1, #i−2, and the like in the negative direction are similarly determined.

FIG. 8A illustrates a graph related to the design of a g value distribution in which the horizontal axis indicates node number and the vertical axis indicates g value. As illustrated in FIG. 8A, the graph of the g value has a shape that periodically changes. The g value graph may be defined by a periodic function such as a Gaussian function, which is described above. It is sufficient that the g value has any periodic characteristic, and the g value does not necessarily form a well-shaped graph.

The computer 1 creates such a network of the reservoir unit 202. In a creation example, as described above, the network of the group of the nodes 12 circularly connected to each other is created, the nodes 12 on the circle are numbered in the circumferential direction (for example, the positive direction), and the periodic g value is set in order of the numbers of the nodes 12 on the circle. This includes connecting the node 12 having the first number #1 to the node 12 having the final number #N. FIG. 8B corresponds to FIG. 8A, and illustrates an image of g value assignment in the network of the reservoir unit 202. FIG. 8B illustrates an example in which the g value is assigned from the number #1 to the number #10 in the positive direction in a sequential order. The creation example is not limited to this, and it is sufficient that the structure of the RC 200 as in FIG. 2 can be achieved.

The periodic characteristic of the g value of the nodes 12 is not limited to a one-cycle configuration as in FIG. 8A. FIG. 8C illustrates a characteristic in a modified example in which the g value changes between the minimum value and the maximum value every two cycles.

As another creation example, the following can be given. The computer 1 creates the network of the group of the nodes 12 circularly connected to each other, and prepares as many any nonlinearity parameters (g values) as the number N of the nodes 12. The plurality of g values may be distributed in any manner and there is no limitation. FIG. 8D illustrates a set of g values related to the design of the g value distribution. Then, the computer 1 sets the minimum g value of the prepared g values to a certain node 12 on the circle, for example, the selected node 12 having #i. The computer 1 sequentially assigns, from the node 12 having #i, the remaining g values to the adjacent nodes 12 on the circle (for example, the nodes 12 having #i+1 and #i−1) in the ascending order of the g values. FIG. 8E illustrates an image of assignment in this case. The descending order of the g values can be employed. In this way, with the method that sequentially assigns, with a certain node 12 being a starting point, the g values to the adjacent nodes 12 in the descending or ascending order, a network having a predetermined characteristic can be created, like the method in FIG. 8A and FIG. 8B.

[Structure of Reservoir Unit (2)]

Figure 9A:
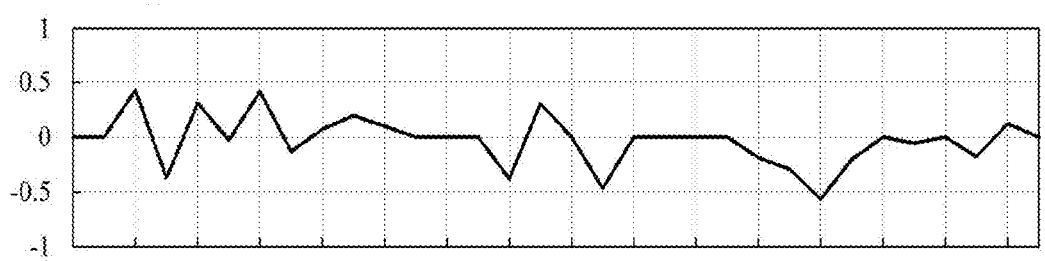
FIGS. 9A to 9C are diagrams illustrating a creation example of the weight matrix of the reservoir unit in Embodiment 1.
Figure 9B:
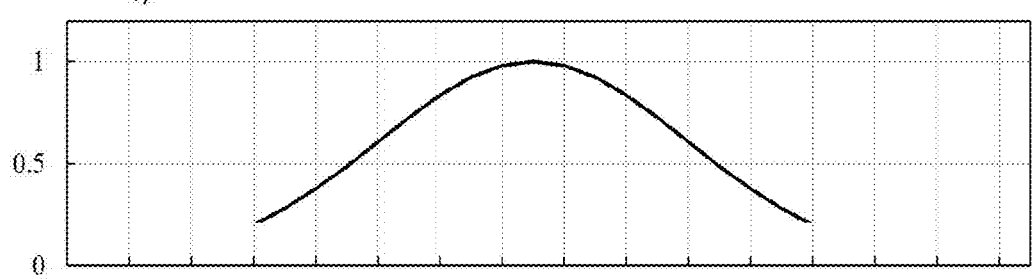
Figure 9C:
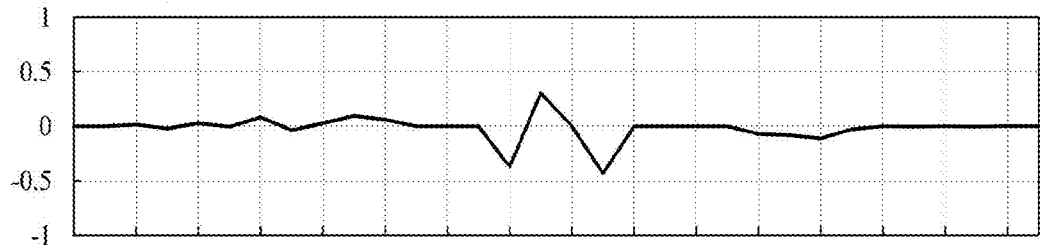

Further, FIGS. 9A to 9C illustrate a specific example of the creation of the weight matrix of the reservoir unit 202 (the weight $W^{res}_{ij}$ between the nodes 12) described above. In the present example, a case where the number N of the nodes 12 is 32 (i=1 to 32) and j=16 is described. In each graph of FIGS. 9A to 9C, the horizontal axis indicates node number. FIG. 9A illustrates an example of the two-dimensional array $W^{rand}_{ij}$ having random values. In the generation of the two-dimensional array $W^{rand}_{ij}$, any random function may be used. FIG. 9B illustrates the two-dimensional array $W^{gauss}_{ij}$ based on a Gaussian function. A Gaussian function is a function that provides a periodic change as illustrated in FIG. 9B. In the present example, to achieve circular connections, the Gaussian function is used. FIG. 9C illustrates the weight $W^{res}_{ij}$ that is obtained by the computation (for example, the product) of the two-dimensional array $W^{rand}_{ij}$ in FIG. 9A and the two-dimensional array $W^{gauss}_{ij}$ in FIG. 9B. The weight $W^{res}_{ij}$ in FIG. 9C indicates a weight between the node 12 having the number #16 and each of the remaining nodes 12. In the vicinity of the node number 16, the weights are relatively large.

[GUI]

The computing system of Embodiment 1 provides, for example, a screen that serves as a graphical user interface (GUI) to the user using the input apparatus 104 and the output apparatus 105 in FIG. 1. On the GUI screen, information on the configuration of the RC 200 as in FIG. 2, specifically, at least information on the network model of the reservoir unit 202 is displayed. The user can set or confirm the model of the reservoir unit 202 on the GUI screen. The user can also perform the advanced settings of the g value of the reservoir unit 202, for example. On the GUI screen, for example, the above-mentioned weight matrix may be displayed. The weight matrix may be displayed as numerical values in a table, for example, instead of being displayed as a heat map. On the GUI screen, for example, a g value graph may be displayed. Further, in one aspect, information on the weights or g value may be displayed so as to be superimposed on the nodes 12 or the link 207 in the model in FIG. 2, for example. On the GUI screen, for example, functions or characteristics for defining the g value and setting values such as the minimum value and the maximum value can be set. In one mode, the characteristic of the g value, in particular, the periodic characteristic may be selected from several types of characteristics, such as linear, logarithmic, and sine functions, to be set.

Embodiment 2

Figure 12:
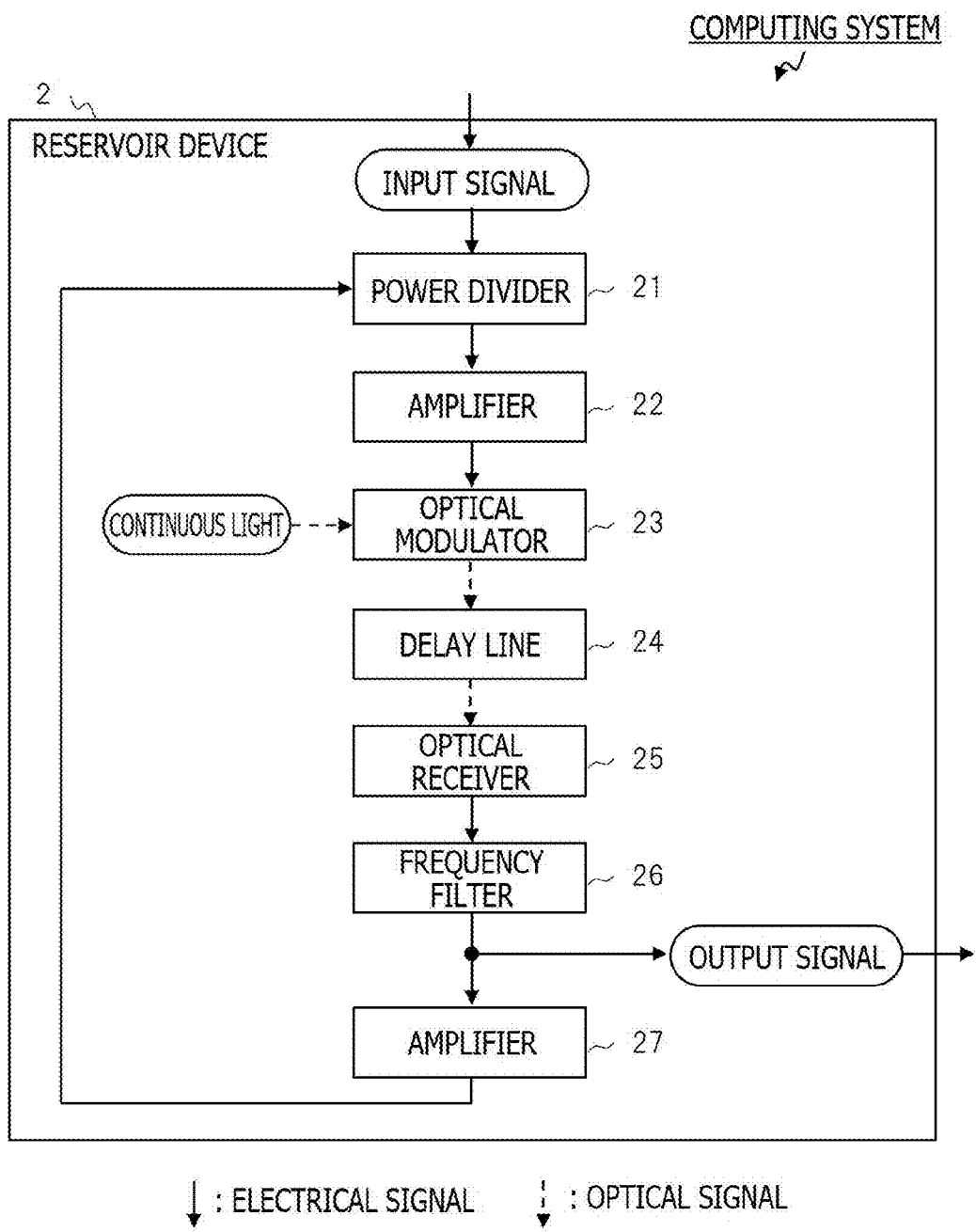
FIG. 12 is a diagram illustrating a configuration example of a reservoir device in a computing system of Embodiment 2.
Figure 13A:
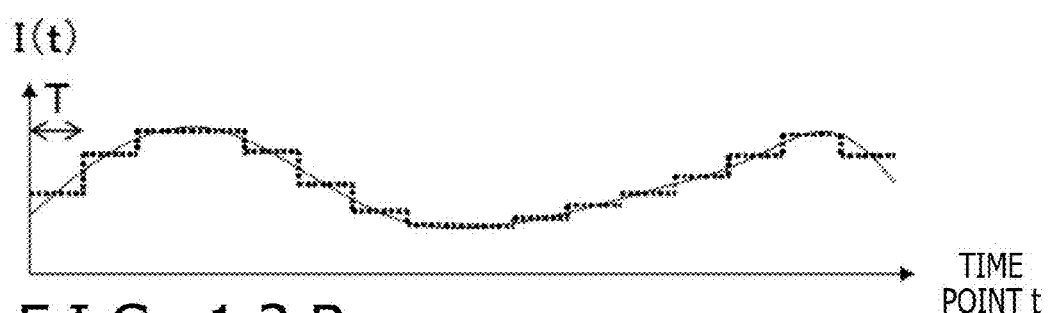
FIGS. 13A and 13B are diagrams illustrating an example of a mask process in Embodiment 2.
Figure 13B:
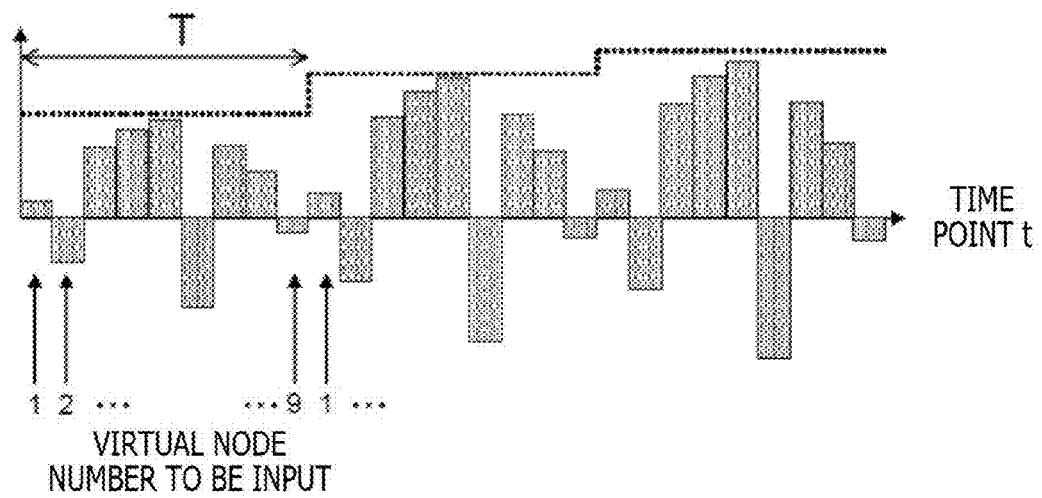

With reference to FIGS. 12, 13A, and 13B, a computing system of Embodiment 2 is described. In the following, configurations of Embodiment 2 different from those of Embodiment 1 are described.

[Computing System]

FIG. 12 illustrates a configuration example of a reservoir device as the configuration of the computing system of Embodiment 2. The computing system of Embodiment 2 is implemented as a reservoir device configured to perform RC. The computing system of Embodiment 2 includes, like Embodiment 1 (FIG. 1), a processing apparatus, a primary storage apparatus, a secondary storage apparatus, an input apparatus, and an output apparatus. Note that, the processing apparatus of Embodiment 2 includes a time delay circuit in addition to a general large-scale integrated circuit.

RC has a feature of not changing weights of a reservoir unit in learning. From the feature, part of signal processing, for example, signal transmission between nodes, can be replaced by a physical phenomenon. With this, preferred performance characteristics such as high-speed processing, low power consumption, and low heat generation can be expected. In physical RC utilizing a physical phenomenon, delay-based RC including time-delay nonlinear nodes and a delay loop has a simple configuration, and can thus be implemented as a device including electronic circuits and optical circuits. In particular, optical circuits have features of high-speed communication and low propagation loss, and can thus be expected to contribute to high-speed and low power consumption signal processing.

In delay-based RC, a plurality of virtual nodes are designed in a delay line. In this case, the virtual nodes are provided successively in the delay line, and hence the virtual nodes closer to each other tend to have stronger connections therebetween in general. Moreover, a delay time corresponding to the feedback cycle of a signal is indicated by T, the number of the virtual nodes is indicated by N, and virtual node outputs are numbered by 1, 2, . . . , and N in order of input to the same delay line. Then, a virtual node output that is input next to an N-th virtual node output at the time point t is the first virtual node output at a time point t+T. Although the time point is shifted by one step (by the delay time T), a circular network is formed. Thus, it can be said that, as RC to be applied to the embodiment, delay-based RC is suitable.

Accordingly, the computing system of Embodiment 2 employs the physical RC and delay-based RC, which are described above, and implements part of the signal processing thereof with the use of a device including an optical circuit. The computing system of Embodiment 2 has a nonlinearity parameter (g value) that takes a periodic value with respect to the nodes 12 on the basis of the delay-based RC implemented by a reservoir device 2 including an optical circuit.

The reservoir device 2 in FIG. 12 includes a power divider 21, an amplifier 22, an optical modulator 23, a delay line 24, an optical receiver 25, a frequency filter 26, and an amplifier 27. In FIG. 12, the solid line arrows indicate parts in which electrical signals are transmitted, and the broken line arrows indicate parts in which optical signals are transmitted. The optical modulator 23 and the delay line 24 correspond to an optical circuit or an optical device. Inside the reservoir device 2, while an electrical signal and an optical signal are converted to each other, a feedback loop including the delay line 24 is formed so that an input signal is converted to an output signal. The conversion processing corresponds to Steps S6 and S10 in FIG. 4 described above.

The reservoir device 2 inputs an input signal to be identified to the power divider 21. The power divider 21 divides the input signal on the basis of a signal from the amplifier 27. The amplifier 22 amplifies the signal from the power divider 21. The optical modulator 23 modulates the electrical signal from the amplifier 22 on the basis of continuous light. The delay line 24 delays the modulated optical signal from the optical modulator 23. The optical receiver 25 receives the optical signal from the delay line 24 to convert the optical signal to an electrical signal. The frequency filter 26 filters the electrical signal from the optical receiver 25 with a predetermined frequency. The electrical signal from the frequency filter 26 is output as an output signal. Further, the amplifier 27 amplifies the electrical signal from the frequency filter 26, and inputs the amplified electrical signal to the power divider 21.

[Mask Process]

FIGS. 13A and 13B illustrate an example of a mask process by the reservoir device 2. FIG. 13A illustrates the graph of a time series signal in which the horizontal axis indicates time point t and the vertical axis indicates I(t). FIG. 13B illustrates the graph of a modulated signal of the time series signal in FIG. 13A in which the vertical axis indicates light intensity.

The input signal in FIG. 12 is obtained by converting the input value $I_k$ in Expression 2 by the mask process. The reservoir device 2 has the function of performing the mask process. Now, the details of the mask process are described. The input value $I_k$ is a time series signal (indicated by the solid line) that changes depending on the time point t as illustrated in FIG. 13A. The reservoir device 2 first samples the input value $I_k$ with the delay time T to convert the input value $I_k$ to a discrete signal having an interval T (indicated by the broken line). Specifically, the reservoir device 2 executes sample and hold processing. Next, the reservoir device 2 equally divides, as illustrated in FIG. 13B, the delay time T into N, which corresponds to the number N (N=9 in the present example) of the nodes 12 (the corresponding virtual nodes), and modulates each of the N intervals. The optical modulator 23 in FIG. 12 performs modulation.

The value to be modulated corresponds to the element product of the nonlinear parameter array $g_i$ and the input weight matrix $W^{in}_{1k}$ in Expression 2. In FIG. 13B, the periodic nonlinear parameter array $g_i$ that takes the minimum value when the virtual node number i=1, and takes the maximum value when the virtual node number i=5 is used. The nonlinear parameter array $g_i$ (g value) corresponds to a mask pattern in the mask process.

The modulated signal obtained by the above-mentioned mask process (the bar graph of FIG. 13B) is an input signal that is input to the reservoir device 2. Note that, in the computing system of Embodiment 2, a device configured to perform the mask process may be provided externally to the reservoir device 2, or a circuit part configured to perform the mask process may be provided inside the reservoir device 2.

The above-mentioned input signal is added, by the power divider 21, to a signal that is output from the amplifier 27. The signal after addition is amplified by the amplifier 22 to be converted to an optical signal by the optical modulator 23.

In the example of Embodiment 2, the optical modulator 23 is a Mach-Zehnder optical modulator. The optical modulator 23 modulates the strength of continuous light that is input to the optical modulator 23, depending on an electrical signal that is input from the amplifier 22. The electrical signal to optical signal conversion is expressed by Expression 11 below, where V is the voltage of an input electrical signal and P is the amplitude of an optical signal.

$$P(V)=1+\sin(\omega V+\varphi)$$ Expression 11:

In this case, a range in which $\omega V+\varphi$ in Expression 11 may fall is limited to a half-period of the sine function, and the amplification factor $\omega$ of the amplifier 22 and the offset voltage $\varphi$ are adjusted so that the optical signal amplitude P=1 when the voltage V=0. By the operation, signal conversion at the virtual nodes can be designed so that the nonlinearity increases as the corresponding nonlinear parameter array $g_i$ increases.

The optical signal modulated by the optical modulator 23 is transmitted through the delay line 24 to be converted to an electrical signal again by the optical receiver 25. In the example of Embodiment 2, as the delay line 24, an optical fiber is used. By adjustment of the length of the optical fiber of the delay line 24, the delay time T can be adjusted. As the optical receiver 25, a photodiode is used.

The electrical signal that is output from the optical receiver 25 is distorted with the frequency filter 26 having a bandwidth smaller than the frequency of a mask signal. The distortion effect is affected by an output signal of a node having a previous virtual node number. The distortion effect and amplification by the amplifier 27, which is provided in the subsequent stage, thus correspond to computation in the second term on the right-hand side of Expression 2.

The electrical signal that is output from the frequency filter 26 is divided into two. One of the signals is amplified by the amplifier 27 to be input to the power divider 21, to thereby be added to a signal that is shifted by the delay time T and input to the same virtual node. The other signal is sent to next processing as an output signal. Specifically, the output signal is recorded on the output data of the primary storage apparatus 102 and the secondary storage apparatus 103 as a node output value (corresponding to Step S7 in FIG. 4). Alternatively, the node output value is converted to an identification value with the use of an output weight matrix (corresponding to Step S11 in FIG. 4).

As described above, in Embodiment 2, with the use of the delay-based RC, the input value to node output value conversion step in the processing flow in FIG. 4 of Embodiment 1 is implemented as the optical circuit. With this, similar to Embodiment 1, the computing system of Embodiment 2 achieves identification using the single network of the reservoir unit 202 without the need of grasping the degree of nonlinearity preferred for a signal processing task in advance. Moreover, according to Embodiment 2, since the optical circuit is used, there are advantages of increasing the signal processing speed and reducing the power consumption of the signal processing, for example.

In the above, the present invention has been specifically described on the basis of the embodiments, but the present invention is not limited to the above-mentioned embodiments, and various modifications can be made within the scope of the gist thereof.

What is claimed is:

1. A computing system configured to perform computation using a recurrent neural network including an input unit, a reservoir unit, and an output unit,
   the reservoir unit including a plurality of nodes circularly connected to each other,
   the circular connection having a weight matrix for determining a weight between nodes of the plurality of nodes and having, in the weight matrix, a weight between nodes closely arranged on the circle, the weight being larger than a weight between nodes arranged away from each other on the circle,
   the plurality of nodes each having a g value that is a parameter for designating nonlinearity of an activation function of each of the nodes, and that is set so as to periodically change in a direction on the circle.

2. The computing system according to claim 1, wherein the plurality of nodes have logarithms of the g value, the logarithms being set at even intervals in the direction on the circle.

3. The computing system according to claim 1, wherein in the weight matrix, with respect to the nodes, an expected value of an absolute value of a weight between adjacent nodes is larger than an expected value of an absolute value of a weight between nodes adjacent to each other with one node therebetween in the direction on the circle.

4. The computing system according to claim 1, wherein the weight in the weight matrix is determined using a random function.

5. The computing system according to claim 1, wherein the weight in the weight matrix is determined by computation with a random function array and a Gaussian function array.

6. The computing system according to claim 1, wherein the weight matrix is created such that, in the circular connection created with the nodes connected to each other in order of consecutive numbers given to the plurality of nodes, nodes having closer numbers of the numbers have a larger weight.

7. The computing system according to claim 1, wherein the reservoir unit and the output unit have a weight designated by an output weight matrix that is determined by least squares regression in which a sum of squares of an error between a linear sum of output values of the plurality of nodes in learning data input and an ideal output value is minimum.

8. The computing system according to claim 1, wherein the reservoir unit and the output unit have a weight designated by an output weight matrix that is determined by a Lasso regression method in which a regularization term is added to an error between a linear sum of output values of the plurality of nodes in learning data input and an ideal output value.

9. The computing system according to claim 1, further comprising:
   a computer including
      a processing apparatus configured to perform the computation,
      a primary storage apparatus and a secondary storage apparatus each configured to store data related to the computation,
      an input apparatus configured to input data to the input unit, and
      an output apparatus configured to output data from the output unit.

10. The computing system according to claim 1, wherein the recurrent neural network is implemented as delay-based reservoir computing.

11. The computing system according to claim 10, further comprising:
    a reservoir device including an optical circuit, wherein
    the reservoir device performs part of the computation using the optical circuit.

12. The computing system according to claim 11, wherein
    the optical circuit performs a mask process on an input signal to the reservoir device, and
    the mask process includes processing that uses a mask pattern whose strength periodically changes depending on how the g value is set on the circle.

13. A computing method for a computing system configured to perform computation using a recurrent neural network including an input unit, a reservoir unit, and an output unit, the computing method comprising:
    creating the reservoir unit, wherein
    the reservoir unit includes a plurality of nodes circularly connected to each other,
    the circular connection has a weight matrix for determining a weight between nodes of the plurality of nodes and has, in the weight matrix, a weight between nodes closely arranged on the circle, the weight being larger than a weight between nodes arranged away from each other on the circle, and
    the plurality of nodes each have a g value that is a parameter for designating nonlinearity of an activation function of each of the nodes, and that is set so as to periodically change in a direction on the circle.

* * * * *